United States Patent [19]
Johnson et al.

[11] Patent Number: 6,098,171
[45] Date of Patent: Aug. 1, 2000

[54] PERSONAL COMPUTER ROM SCAN STARTUP PROTECTION

[75] Inventors: Robert Duane Johnson, Raleigh; Randall Scott Springfield, Chapel Hill; Joseph Wayne Freeman, Raleigh; Ralph Bonomo, Cary, all of N.C.

[73] Assignee: International Business Machines Corporation, Armonk, N.Y.

[21] Appl. No.: 09/052,733

[22] Filed: Mar. 31, 1998

[51] Int. Cl.⁷ ................................................... G06F 11/00
[52] U.S. Cl. ............................................ 713/200; 713/201
[58] Field of Search ................................. 713/200, 202, 713/2, 201

[56] References Cited

U.S. PATENT DOCUMENTS

| | | | |
|---|---|---|---|
| 4,942,606 | 7/1990 | Kaiser et al. | 713/202 |
| 5,097,506 | 3/1992 | Kaiser et al. | 713/202 |
| 5,287,519 | 2/1994 | Dayan et al. | 713/202 |
| 5,359,660 | 10/1994 | Clark et al. | 713/201 |
| 5,388,156 | 2/1995 | Blackledge, Jr. et al. | 713/202 |
| 5,410,707 | 4/1995 | Bell | 713/2 |
| 5,724,027 | 3/1998 | Shipman et al. | 713/201 |
| 5,742,758 | 4/1998 | Dunham et al. | 713/200 |
| 5,802,318 | 9/1998 | Murray et al. | 710/100 |

*Primary Examiner*—Ly V. Hua
*Attorney, Agent, or Firm*—Bernard D. Bogdon; Andrew J. Dillon

[57] ABSTRACT

Provides management tools for a System Owner to assure that a personal computer system is secured against access by an unauthorized user by foreclosing the possibility of circumventing a system's security protection during an adapter ROM scan. If security function, such as that for C2 functionality, is enabled, prior to the adapter ROM Scan for the system, the POST code detects whether or not disabling of the keyboard during adapter ROM Scan is enabled. If enabled, the keyboard is disabled or locked prior to adapter ROM Scan. On some systems, the security function may not be used and, the system does not consider password protection for the adapter utilities. If however, the security functionality of the system is enabled, the POST code will continue to enable the password protection for the adapter ROM Scan. Once the input device, e.g., keyboard, is disabled the adapter ROM scan will begin. Upon completion of the adapter ROM scan, the input device will be enabled and progress will continue through POST.

11 Claims, 6 Drawing Sheets

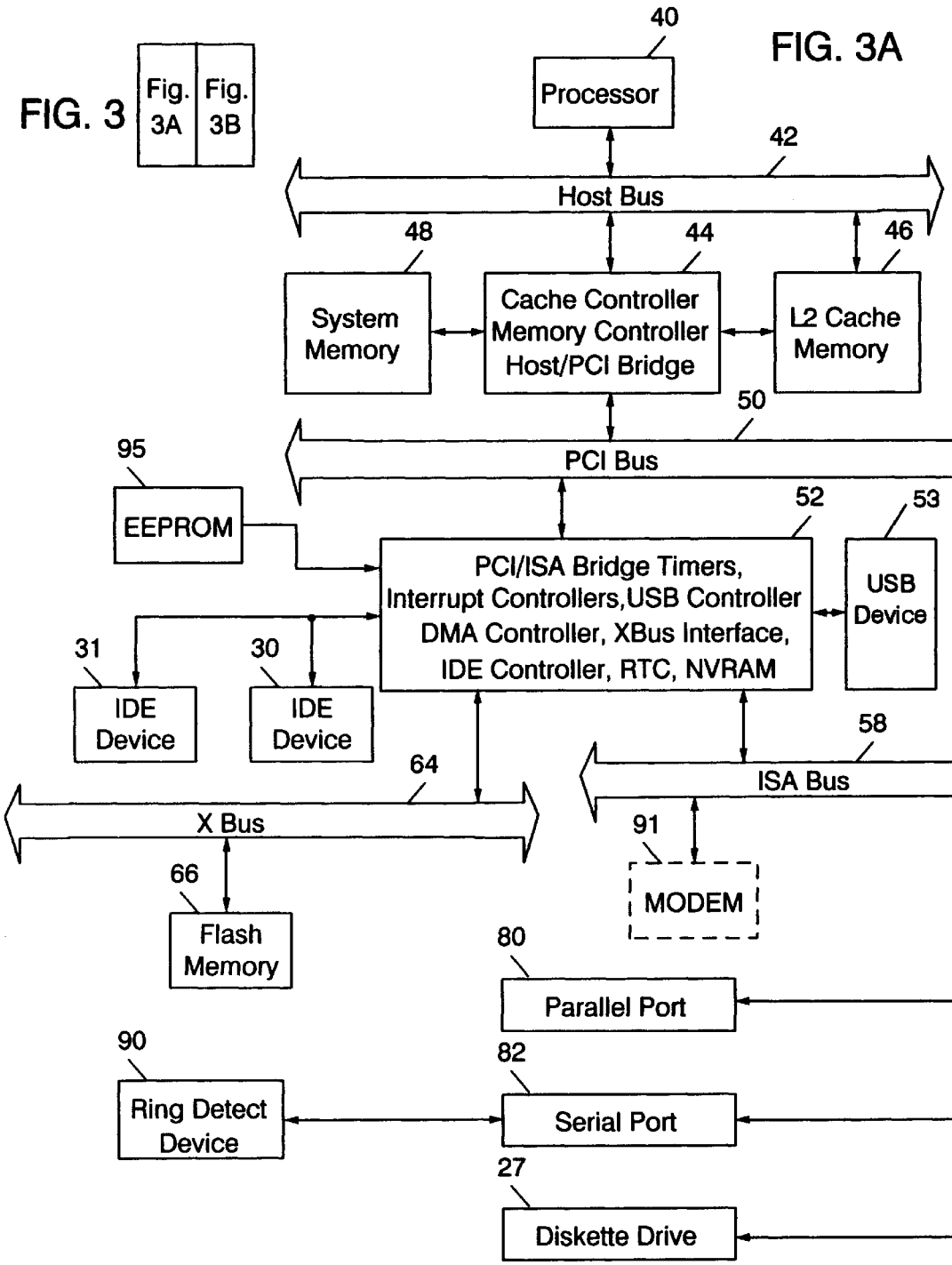

PERSONAL COMPUTER ROM SCAN STARTUP PROTECTION

TECHNICAL FIELD

This invention relates to personal computer system startup protection and, more particularly, to such a system having security features which provide protection and control over the access to data retained in such a system during startup.

BACKGROUND OF THE INVENTION:

Personal computer systems are well known in the art. Personal computer systems have attained widespread use for providing computer power to many segments of today's modern society. Personal computers can typically be defined as a desktop, floor standing, or portable microcomputer that is comprised of a system unit having a single central processing unit (CPU) and associated volatile and non-volatile memory, including random access memory (RAM) and basic input output system read only memory (BIOS ROM), a system monitor, a keyboard, one or more flexible diskette drives, a CD-ROM drive, DVD capability, a fixed disk storage drive (also known as a "hard drive"), an input device such as a keyboard or a so-called "mouse" pointing device, and an optional printer. One of the distinguishing characteristics of these systems is the use of a motherboard or system planar to electrically connect these components together. Examples of such personal computer systems are IBM's PC 300 series and IBM's Aptiva Series.

With the phenomenal growth and use of personal computers in the world in recent years, more and more data or information is being collected and retained or stored in such systems. A lot of this data is sensitive in nature. When such data becomes available to those for whom it was not intended, that data could be the subject of embarrassment to certain individuals, a company could lose a competitive edge, or sensitive data could be used to force payment for silence or lead to physical violence against individuals. As more users recognize the sensitive nature of data and its positive or negative value, the more it becomes desirable to protect against misappropriation and misuse of that data. To protect themselves and the persons associated with the stored data, users are requiring incorporation of security and integrity features into the personal computers that they purchase.

Users are not the only people to recognize the sensitivity of the data being collected and stored. Governments are also enacting laws to enforce protection of sensitive data. One such government is that of the United States. It has recognized and responded to the gravity of the situation. The United States federal government has defined security levels and the associated requirements it takes to meet those levels, and provides a certification agency for personal computer manufacturers to submit products in order to see if the products meet the security level claimed by the manufacturer. The source for the federal requirements is the Department of Defense, Trusted Computer System Evaluation Criteria, DOD 5200.28 STD, 12/85, generally referred to as "The Orange Book." The government has legislated that as of Jan. 1, 1992 all data related to the government must only be processed and stored on personal computers with at least a security level of C-2. For computer system hardware, the essence of the requirements is contained in the Assurance section of The Orange Book, at Requirement 6 whereat it states: "trusted mechanisms must be continuously protected against tampering and/or unauthorized changes. . . "

Beginning with the earliest personal computer systems, such as the IBM Personal Computer, it was recognized that software compatibility would be of utmost importance. In order to achieve this goal in an effective manner, an insulation layer of system resident code, also known as "firmware", was established between the hardware and software. This firmware provided an operational interface between a user's application program/operating system and the device to relieve the user of the concern about the characteristics of hardware devices. Eventually, the system resident code developed into a Basic Input/Output System (BIOS), for allowing new devices to be added to the system, while insulating the application program from the peculiarities of the hardware.

Included in the BIOS code is a Power-On-Self-Test (POST) code which performs a number of predefined tests on the system hardware and allows for the hardware to be configured by an end user to match the operational requirements needed. For example, the POST code generally tests the system memory and performs an adapter ROM scan to detect additional I/O adapter card hardware.

Once POST has initialized the base function for the system, the adapter ROM Scan is initiated. The percentage of POST code that is run to achieve an initial level of operation is variable, but generally amounts to over fifty percent. The adapter ROM Scan initialization is a sequence of events whereby the system level POST code will search the memory address space looking for adapter ROMs in the memory address space by looking for a particular ROM signature or identifier in memory. If the signature or identifier is located, POST will verify that the adapter ROM is valid by running various authentication mechanisms. Once the adapter ROM has been authenticated as a valid adapter ROM, POST will relinquish control to the adapter ROM and the adapter ROM code will begin execution. Once the adapter ROM code has completed execution, and the adapter ROM is following the proper adapter ROM architecture, the adapter ROM code will return control to the system level POST.

A user may invoke a BIOS Setup utility by entering a predefined input which, for example, allows the user to designate a boot storage device from which an operating system is loaded. During adapter ROM Scan, predefined system addresses are scanned for detecting and configuring I/O adapter cards. During adapter ROM Scan, POST code searches the system memory for predefined signatures and once detected, the system control is relinquished to the I/O adapter card. For example if an external video adapter card is installed, during adapter ROM scan the video card ROM code takes control of the system CPU to configure the system video features, such as allocating video memory space.

The importance of BIOS is readily evident. For example, it frees a device driver from depending on specific device hardware characteristics while providing the device driver with an intermediate interface to the device. Since BIOS is an integral part of the system and controls the movement of data in and out of the system processor, it is usual and expedient to make it resident on the system planar and it is generally shipped to the user in a flash memory.

Because of BIOS's role in controlling functionality and the configuration of computer systems, it is evident that it is necessary to protect system BIOS against unauthorized access. Various password protection methods have been devised prompting users to enter an authorization key prior to allowing access to BIOS configuration utilities.

With the advent of intelligent I/O adapter cards, I/O utilities stored in an adapter ROM are used to configure the I/O adapter card. If during POST initialization an adapter ROM is detected, control passes to the adapter ROM to setup the device associated with the adapter ROM (e.g., SCSCI hardfile, video, etc.), and afterwards control passes back to POST. These I/O utilities are executed during the adapter ROM scan which occurs during POST initialization code. The utilities executed during the adapter ROM scan are considered part of the configuration routines which come under the security protection such as C-2 scrutiny and integrity architecture.

One of the features of the C-2 security design is the detection of tamper evidence on the system. Preferable is a system whereby, the user will be able to detect whether a system has been physically tampered with or otherwise broken into. Upon detection of such tamper evidence, the POST may be programmed to display a tamper evident error code and force the user to enter an authorization key.

Some of the I/O adapter cards, such as shown in FIG. 3B as adapter card 51 and connected to the PCI bus 50, are structured to provide for their respective I/O utilities to be invoked during a specified time interval. This can be accomplished by entering a predefined external input, such as a predefined key sequence entered at the respective specified time or protocol sequence interval. It should be understood that any external or input device can be employed to invoke such an utility. Once the predefined key sequence is entered, the adapter ROM based utility takes control of the system CPU, giving the user the ability to change I/O related configuration. The condition provides for convenience of operation, however it also provides for a possible condition of violation of set security. Thus, potentially, an unauthorized user is able to program an adapter ROM based utility to control the CPU to access to the system level configuration. As a result, the unauthorized user may select a boot device for loading an operating system for accessing secured data.

Unfortunately, outside, for example, of efforts described in U.S. Pat. document Ser. No. 08/681,740, currently only the system level configuration utilities and not the adapter level utilities offer an unique password protection and offer a better situation for achieving full security protection. Further, even in such systems adequate security routines are not invoked because of utilities which allow for configuration changes during an adapter ROM Scan process. As such, an unauthorized user can take control of the system by invoking the predefined key sequence without entering an authorization key, which is a security violation. Under these circumstances adapter ROM code would accept, for example, KB (keyboard) input which would then go to setup which includes "FORMAT".

As previously stated, in start-up, a process is invoked as part of the power on initialization process which is well before the bootstrap process is initialized, that searches for adapter cards that have Read Only Memories (ROMs) fitted to them and that contain additional BIOS (Basic Input Output System) code that supports the unique requirements of the adapter card. If one of these adapter ROMs is found, control of the system is passed to the code within the ROM to perform necessary initialization works so that the adapter card can function. In the design of most personal computer BIOS, this function is performed before the bootstrap process is invoked, and before the security password is checked, as hereinbefore noted.

Notwithstanding, on occasion, the operation of these adapter ROMs can provide an opportunity to violate system security. An example is the Adaptec SCSI Adapter, Model 2940, that provides a utility that can be accessed during the period of time that the adapter ROM code has control during the adapter ROM scan process. Access can be, for example, by a simple keying sequence from the system keyboard. This particular undesirable feature of the utility, if used for clandestine purposes, provides the user with the ability to change the configuration of the attached devices, e.g., SCSI, and, to perform a destructive format to any of the attached SCSI hard drives. Under these circumstances if, for example, keyboard input occurs, instead of going to setup the system could function from other code that prompts for the password. If the password is correct it continues to setup, if not the system halts. However, the keyboard vector can be changed by the adapter ROM utility code, which circumvents any authorized user's password vector which then avoids the desired password routine.

Obviously, this gives an individual without positive or good intentions an opportunity to cause great damage to a system's security, even if the system had power-on-password protection turned on.

SUMMARY OF THE INVENTION

With the foregoing in mind, the present invention provides management tools for a System Owner or Authorized User to assure that a personal computer system is properly and more completely secured against access by an unauthorized user by foreclosing the possibility of circumventing a system's security protection during an adapter ROM scan.

Since adapter ROMs now present the basis for permitting unanticipated configuration utilities to be run during the system's POST ROM Scan, as shown in FIG. 4 at step 106, password protection is required to prevent this and then not only at the end of POST as is typically done in the current systems.

This invention overcomes this problem by disabling or providing a locked condition for any input device or pointing device, such as a keyboard and a mouse during the ROM scan process. A user option is provided in the security section of the BIOS setup function to enable or disable this locking function. The option cannot be changed if the user has turned on password security, unless the password is entered at the beginning of the BIOS setup program. The interface is disabled or locked in a hardware specific fashion that would make it very unlikely that the optional ROM code would enable or unlock the keyboard interface.

In a specific implementation of this invention, the input devices are locked by setting an "Enable/Disable" control bit, within one of the configuration registers of an I/O controller, for example as shown in FIGS. 3A/3B, to the "disable" state before the ROM Scan starts. It is set from the system ROM BIOS code. When this control bit is in the "disable" state, the pointing device controller element will not pass keyboard input or any other input device input into the system.

Since there are a number of I/O controllers available in the industry and each of them uses a different scheme for enabling/disabling devices, it is unlikely that the adapter ROM code would be able to enable or unlock the controlled device if it had been disabled or locked as described.

It should be noted that this design is extensible to any type and/or variety of ROM scans that may occur in a computer system. It is not limited to any particular bus architecture and may be incorporated numerous times in a system POST as numerous ROM scans can reside in a system POST.

It should be noted that the fundamental idea of this invention is not restricted to the keyboard interface that is currently common in the industry. For example, there is a prominent standard interface the universal serial bus (USB) that is used to connect a variety of user input devices, e.g., keyboards, mice, UPC scanners, joysticks, touch screens, smart-card readers, etc. This invention supports the universal serial bus (USB) BIOS and can include a "disable" function that will block input from the USB if the security function of this invention has been enabled.

This feature provides a level of security that is above that offered by most other systems common in the industry today. It offers an advantage feature to accommodate customers who have requirements for high levels of system and data security.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF THE PREFERRED EMBODIMENT

Figure 1:
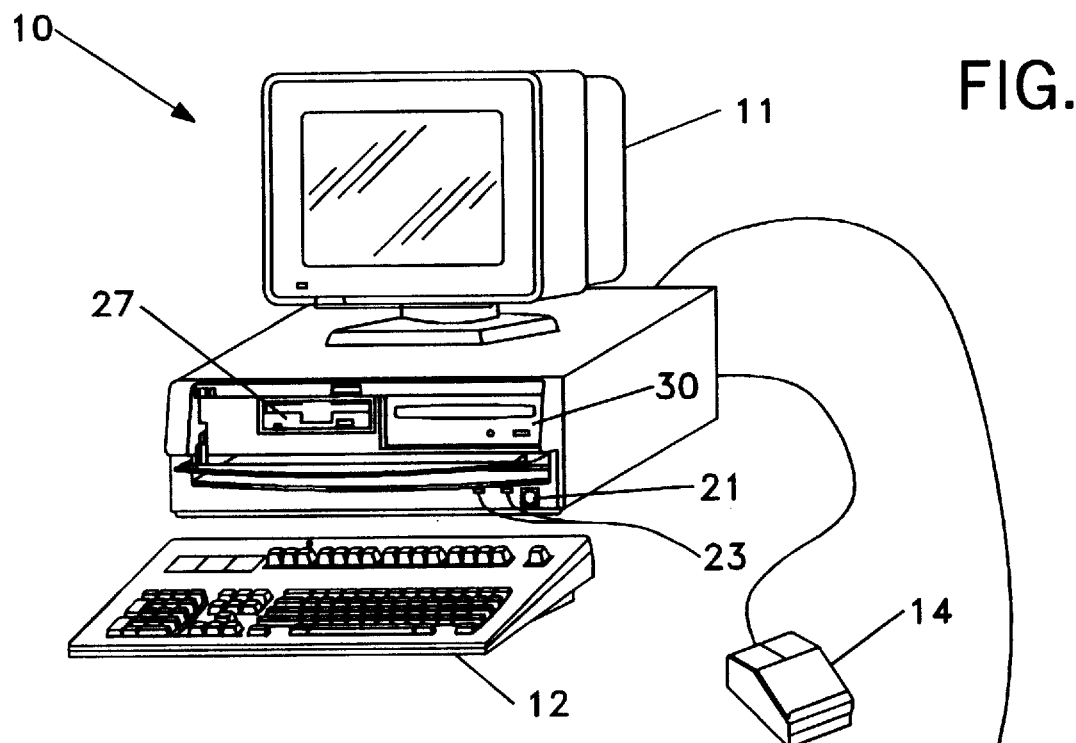
FIG. 1 is a perspective view of a network of two personal computers including display units and input devices embodying this invention.
Figure 1:
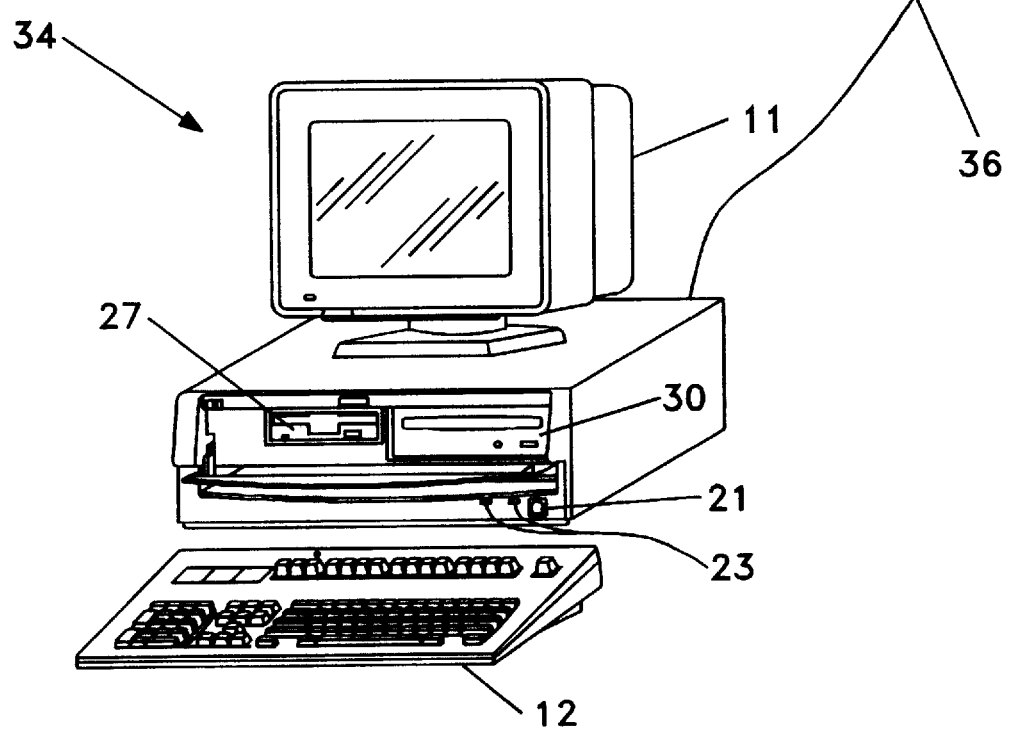

While the present invention will be described more fully hereinafter with reference to the accompanying drawings, in which a preferred embodiment of the present invention is shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Certain terms that may be used and may be helpful to the understanding of this invention and its intended use are as follows:

(A) TRUSTED COMPUTING BASE (TCB): The trusted computing base is the totality of protection mechanisms within a computer system—including hardware, firmware and software—the combination of which is responsible for enforcing a security policy. A TCB consists of one or more components that together enforce a unified security policy over a product or system. The ability of a TCB to correctly enforce a security policy depends solely on the mechanisms within the TCB and on the correct input by system administrative personnel of parameters (e.g., a user's clearance) related to the security policy.

(B) TRUSTED SOFTWARE: Trusted software is the software portion of a Trusted Computing Base.

(C) TRUSTED PROGRAM: A trusted program is a program included in Trusted Software.

(D) OPEN PROGRAM: An open program is a program operable on a Trusted Computing Base and which is other than a Trusted Program.

(E) REFERENCE MONITOR CONCEPT: A reference monitor concept is an access control concept that refers to an abstract machine that mediates all accesses to objects by subjects.

(F) SECURITY KERNEL: A security kernel is the hardware, firmware and software elements of a Trusted Computing Base that implement the Reference Monitor Concept. It must mediate all accesses, be protected from modification and be verifiable as correct.

(G) TRUSTED COMPUTER SYSTEM: A system that employs sufficient hardware and software integrity measures to allow its use for processing, simultaneously, a range of sensitive or classified information.

(H) SYSTEM OWNER: The system owner is the user who is responsible for configuring and placing a system in secure mode initially. The system owner will control the configuration both initially and whenever an update needs to be made. This person will control the Privileged Access Password and be responsible for maintaining its integrity. The system owner will also maintain physical security of the tamper evident cover keylock key. The system owner will be responsible for maintaining security logs on all systems. The system owner will also record all attempted security breaches. The system owner may own more than one system. The system owner is considered an authorized user and can also be a normal user.

(I) PASSWORD DESCRIPTION: The system has the potential to be protected by two passwords: first, Privileged Access Password (PAP) and second, Power On Password (POP). These passwords are intended to be used independently of one another. The PAP is designed to provide protection for the System Owner by protecting the Initial Program Load (IPL) device boot list and access to the BIOS setup utility. The existence of the PAP will be transparent to a normal user using the POP. The PAP will be installed, changed, or deleted by the BIOS setup utility. The PAP, when set and correctly entered, will give the System Owner access to the entire system, overriding the POP. The POP is used to prevent any unauthorized access to the operating system on the DASD (direct access storage device) or the facilities of the system.

(J) SECURE MODE: Secure mode is the condition when a system owner has successfully installed the Privileged Access Password on a personal computer system to invoke security protection provided by the security and integrity elements.

(K) AUTHORIZED USER: The authorized user is any user who is given permission to use the Privileged Access Password (PAP). This person may or may not be the System Owner. This person may also have a key for a particular system or a set of systems. If this person is involved in recovering a system from a security breach, the person is responsible for reporting it to the System Owner. An authorized user may also be a normal user.

(L) NORMAL USER: A normal user is any user of a system authorized to use the system facilities. In order to change a system configuration or fix a problem, this user requires the assistance of either the System Owner or an Authorized User. The normal user does not have the Privileged Access Password (PAP) or the tamper evident cover keylock key unless the user is included in either the Authorized User or System Owner category.

(M) UNAUTHORIZED USER: An authorized user is any one not defined as a System Owner, Authorized User or Normal User. Any use or modification of a secured personal computer system other than an unsuccessful power on, by an unauthorized user is considered a security breach and an audit trail is to be established showing any such breaches.

(N) FLASH: Flash is electrically erasable programmable read only memory. This memory technology provides for non-volatile storage of data that can be changed under control of hardware logic. Contents of such storage is not lost when power is absent. Contents may be altered only when the appropriate controls signals on the module are activated in a predefined sequence.

Figure 2:
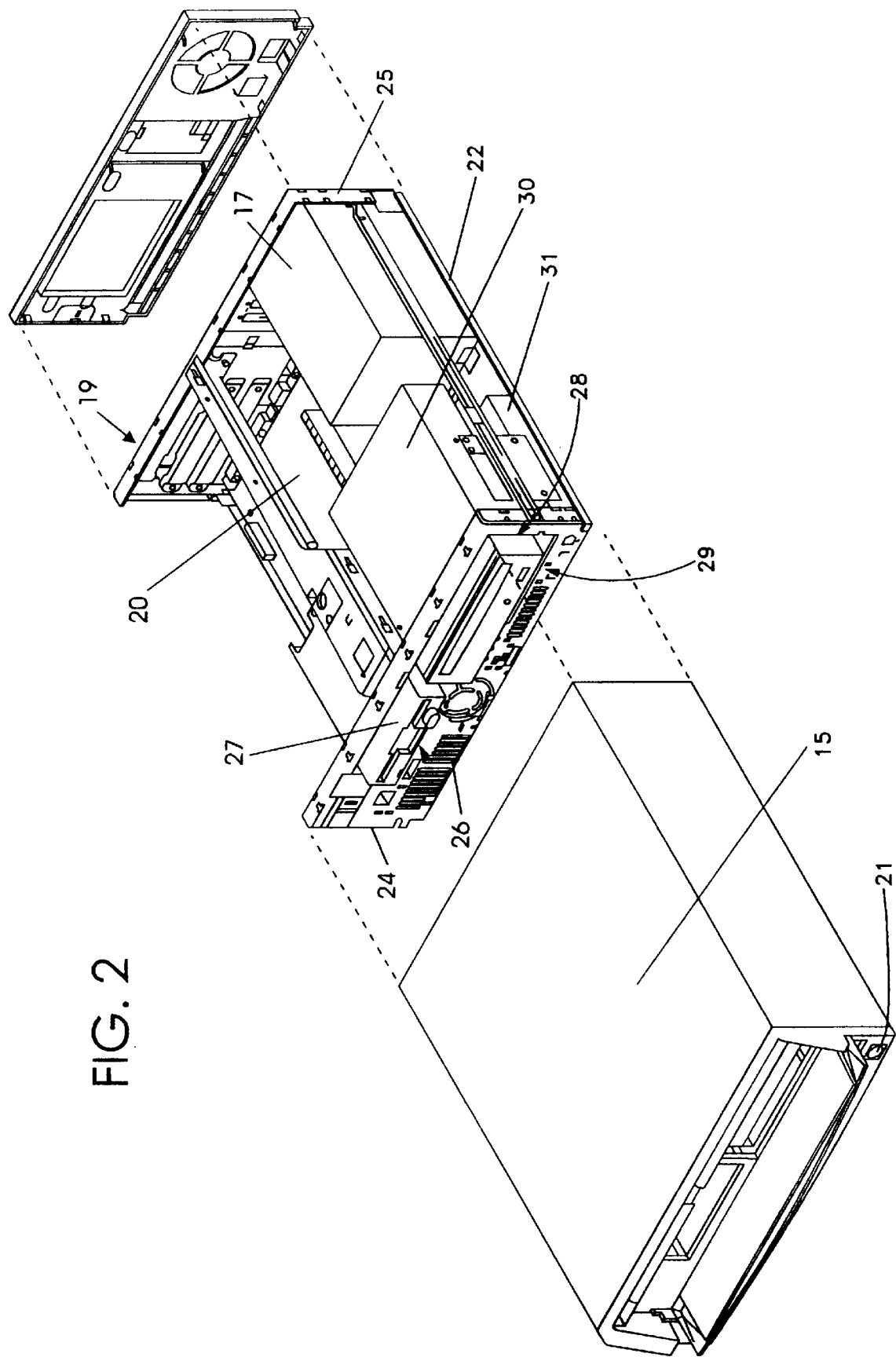
FIG. 2 is an exploded perspective view of certain elements of the personal computers of FIG. 1, including a cover, a chassis including a planar board and a drive, and illustrating certain relationships among those elements.

Referring now more particularly to the accompanying drawings, computer systems embodying the present invention are there shown and generally indicated at and 34 in FIG. 1. As mentioned hereinabove, the computer system 10 or 34 may have an associated display monitor 11, a keyboard 12, a mouse 14, and printer or plotter (not shown). As seen in FIG. 2, the typical computer has a cover 15 included as a decorative and protective member and a back plate shield member 18 which cooperate with a chassis 19 to define an enclosed, shielded volume for receiving electrically powered data processing and storage components for processing and storing digital data. At least certain of these components are mounted on a multi-layer planar 20 or motherboard which is mounted on the chassis 19 and provides an assembly for electrically interconnecting the components of the computer, including those identified above and such other associated elements as floppy disk drives 27, various forms of direct access storage devices, accessory adapter cards or boards, and the like. As pointed out more fully hereinafter, provisions are made in the planar 20 for the passage of input/output signals to and from the operating components of the microcomputer. In FIG. 1, for illustrative purposes computer system 10 is shown connected by cable 36 to another typical computer system 34, which is similar in nature and function to the illustrated computer system 10.

The typical computer system 10, as best seen in FIGS. 1 and 2, has a power supply 17, a power button 21, also herein referred to as switch 21, and power/feedback LED 23. The chassis 19 has a base 22, a front panel 24, and a rear panel 25. The front panel 24 includes at least one open bay, and in the form illustrated it has four bays. These bays are for receiving a data storage device such as a disk drive for magnetic or optical disks, a tape backup drive, or the like. In the illustrated form, a pair of upper bays 26, 28 and a lower bay 29 are provided. One of the upper bays 26 is adapted to receive peripheral drives of a first size, such as those known as 3.5 inch drives, while the other bay 28 is adapted to receive drives of a different size, such as a CD ROM drive, and the lower bay is adapted to receive another drive. One floppy disk drive is indicated at 27 in FIGS. 1 and 2, and is a removable medium direct access storage device (DASD) capable of receiving an inserted diskette. As is generally known, the diskette is used to receive, store and deliver data. One CD ROM drive is indicated at 30 in FIGS. 1 and 2 and is a removable medium direct access storage device capable of receiving a compact disc and using the disc to deliver data. One hard disk drive is indicated at 31 in FIG. 2 and is a fixed medium direct access storage device capable of storing and delivering data in a manner as is generally known.

Figure 3B:
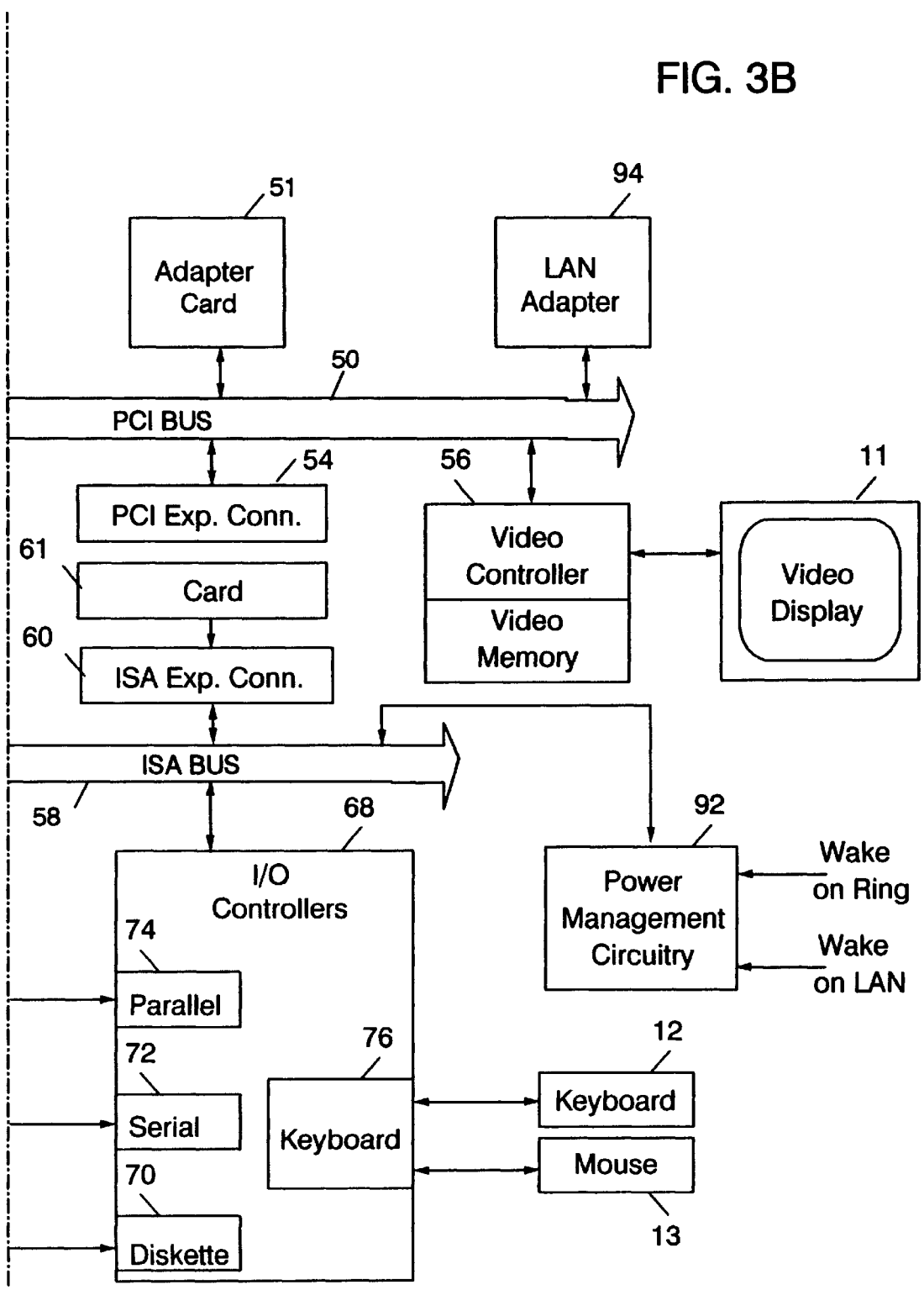
FIG. 3 is composed of FIG. 3A and FIG. 3B which together illustrate a schematic view of certain components of the personal computers of FIGS. 1 and 2.

Prior to relating the above structure to the present invention, a summary of the operation in general of the personal computer system 10 merits review. Referring to FIGS. 3/3A/3B, there is shown a block diagram of a personal computer system illustrating the various components of a computer system such as the exemplary computer system 10 in accordance with the present invention. This system includes components mounted on the planar 20 and the connection of the planar 20 to the I/O expansion connectors and other hardware of the personal computer system 10. Connected to the planar 20 is a system CPU or processor 40 which is connected directly to a high speed CPU host bus 42.

A first system core logic chipset 44 and L2 cache memory 46 are also connected to the host bus 42. The first core logic chipset 44 includes a memory controller unit, a L2 cache controller and a peripheral component interconnect (Host/PCI) bridge. The memory controller unit is further connected to a volatile random access system memory (RAM) 48. The RAM memory 48 is composed of one or more memory modules. The memory controller includes the logic for mapping addresses to and from the microprocessor 40 to particular areas of the system memory RAM 48. The cache controller is operatively coupled to the L2 cache memory 46.

The first core chipset 44 can be, for example, a Triton VX chip available from Intel Corporation. The PCI bridge within the chipset 44 provides an interface between the local bus 42 and a PCI bus 50. Connected to the PCI bus 50 is a second core chipset 52 and a plurality of PCI expansion connectors 54 for receiving PCI bus compatible peripheral cards. One such peripheral card is a video controller 56. The video controller 56 includes video memory and is coupled to the monitor or video display terminal 11. The chipset 52 can be, for example, an PIIX3 chip which is also available from Intel Corporation.

The chipset 52 contains a bus control and timing unit, a plurality of timers, an interrupt controller, a direct access memory (DMA) unit including a controller, nonvolatile CMOS RAM, also herein referred to as NVRAM, a CMOS real-time clock (RTC), an XBus controller, a PCI/ISA bridge, an integrated drive electronics (IDE) controller and an universal serial bus controller. The PCI/ISA bridge provides an interface between the PCI bus 50 and an optional feature or expansion bus such as the Industry Standard Architecture (ISA) bus 58. Connected to the ISA bus 58 are a plurality of ISA expansion connectors 60 for receiving ISA adapter cards 61. ISA adapter cards can be pluggably connected to the ISA expansion connectors 60 and may provide additional I/O devices or memory for the computer system 10. The IDE controller provides for the attachment of IDE compatible storage device(s) 31 including the fixed disk drive 31 and CD-ROM drive 30, best shown in FIG. 2. The USB controller of chipset 52 has typical outputs, including clock and data, and is connected through an industry standard connector to USB configured devices 53, including such items, by way of example only, as printers and joysticks.

The real-time clock is used for time of day calculations and the NVRAM 52 is used to store system configuration data. That is, the NVRAM will contain values which describe the present configuration of the computer system 10. For example, NVRAM within schematic box 52 contains information describing the type of fixed disk or diskette, the list of IPL devices set by a user and the sequence to be used for a particular power on method, the type of display, the amount of memory, time, date, etc. Furthermore, these data are stored in NVRAM whenever a special configuration program, such as configuration/setup, is executed. The purpose of the configuration/setup program is to store values characterizing the configuration of the system to the NVRAM within schematic unit 52.

Alternatively, some items needing a greater level of security can be stored in EEPROM 95. Data in a EEPROM is retained even when power is removed from the system and does not require a battery to retain data like an I/O CMOS controller does.

It should be noted that a key difference between CMOS and EEPROM is that the data within the CMOS is relatively insecure. The interface and access methods for this device are widely known and understood throughout the industry. In reality, there is a de facto standard. Consequently, it is possible that the data in CMOS could be altered either accidentally (e.g., a bug in an application or operating system) or on purpose (e.g., a virus) by a program other than the BIOS code, which is the only code that should be altering data in CMOS. Data in CMOS is maintained by use of a battery that powers the chip when AC power to the system is off. A EEPROM does not require a battery to retain data when system power is off.

By contrast, the data in EEPROM 95 can be locked by means of non-resettable control bits so that no code other than the BIOS, mainly, but by example only, the C2 code in BIOS, can either Read or Write the data in the EEPROM. In the EEPROM power must be turned off to reset the control bit.

Coupled to the ISA bus 58 IN FIGS. 3/3A/3B is a multi-function I/O controller 68, for example a National Semiconductor PC87306 device. The I/O controller 68 contains a variety of I/O adapters and other components such as the diskette adapter 70, serial adapter 72, a parallel adapter 74 and a keyboard controller 76. The diskette adapter 70 provides the interface to the diskette drive 27. The serial adapter 72 has an external port connector 82 for attachment of external devices such as ring detect device 90. The parallel adapter 74 has an external port connector 80 for attachment of external devices such as printers (not shown). The keyboard controller 76 is the interface for the keyboard 12 and the mouse 13.

A power management circuitry 92, coupled to the ISA bus 58, operates to accommodate wake-on ring and wake-on LAN and provides for changing the computer system 10 between various states, e.g., off standby, suspend and normal operating states. The power management circuitry 92 is supplied with auxiliary power from the power supply 17 when the computer system 10 is in the off-state, so that it can monitor events which cause the computer system 10 to turn-on. For example, when the system is in the off-state and a telephone ring is detected by the ring detect device 90, a wakeon ring signal is sent from the device 90 through serial port 82 to the power management circuitry 92. In response to receiving this signal the power management circuitry 92 will cause computer system 10 to change to the normal operating state. The ring detect device 90 can be, for example, an external modem or any other device which can detect a telephone ring or prompt and generate the wake-on ring signal to the power management circuitry 92. Such other devices can include motion sensors, voice activated sensors, light sensors, etc. In addition, an internal modem 91 could be connected directly to the ISA bus 58 or the PCI bus 50. The modem 91 is wired to a modem pin on the planar 20 and is operative to generate the ring signal when it detects a telephone ring or prompt.

The power management circuitry 92 also includes a timer which is configurable by a user to expire after a predetermined period of time. When the timer expires, the power management circuitry 92 will cause the computer system 10 to change from the off-state to the normal operating state.

A LAN adapter 94 can be coupled to either the PCI bus 50 or the ISA bus 58 for allowing the computer system 10 to communicate via connection 36 with a remote computer 34, as shown in FIG. 1, or a server over a LAN. The LAN adapter is supplied with auxiliary power from the power supply 17 when the computer system 10 is off. The LAN adapter 94 scans all incoming frames from the LAN addressed to the computer system 10 for a specific data frame. When this data frame is received, the LAN adapter 94 alerts the power management circuitry 92 via a wake on LAN signal to power on the computer system 10. This is a change from the off-state to the normal operating state. The LAN adapter 94, for example, can be an IBM Auto Wake Token-Ring ISA Adapter device.

As shown in FIGS. 3/3A/3B, a planar XBus 64 is coupled to the PCI bus 50 and the ISA bus 58 through the chipset 52. The planar XBus 64 includes address, data, and control components, respectively. The planar XBus 64 is an additional I/O bus in the computer system 10 and is used as a local bus to support slow speed peripheral devices that reside on the planar board 20. Attached to the XBus 64 is a flash memory (FM) module or chip 66.

The flash memory 66 is an electrically erasable programmable read only memory (EEPROM) module or chip and includes the BIOS that is used to interface between the I/O devices and the operating system of the computer system. BIOS stored in memory 66 can be copied into RAM 48 to decrease the execution time of BIOS. Flash memory 66 is further responsive to the XBus controller through the ROM-SEL (ROM select) signal within chipset 52. If system RAM 48 is disabled for the BIOS address range then access requests to that address range are passed through the host bridge 44 and the PCI/ISA bridge to memory 66. If system RAM 48 is enabled for the BIOS address range, then access requests to that address range are directed to the system RAM 48.

While the present invention is described hereinafter with particular reference to the system block diagram of FIGS. 3/3A/3B, it is to be understood at the outset of the description which follows that it is contemplated that the apparatus and methods in accordance with the present invention may be used with other hardware configurations of the planar board. For example, the system processor 40 could be an Intel Pentium processor, Cyrix 586-P75 processor or Advanced Micro Devices 8486 processor or any other suitable microprocessor.

The EEPROM plays a role in security provisions as herein described and in assignee's U.S. Pat. No. 5,388,156, issued Feb. 7, 1995, and entitled "Personal Computer System with Security Features and Method," which patent is herein incorporated by reference. That patent provides discussion of a layered password protection strategy.

In achieving certain objectives of securing a personal computer system as described herein, the personal computer system 10 has an erasable memory element mounted within the system enclosure for selective activation to active and inactive states and for receiving and storing a Privileged Access Password (PAP) when in the active state. The erasable memory element preferably is at least one field or portion of the electrically erasable programmable read only memory device or EEPROM 95 of FIGS. 3/3A/3B described above. The system also has an option or security switch mounted within the enclosure on the planar board 20 and operatively connected with the erasable memory element 95 for setting the used field or portion of that memory element to the active and inactive states. The option switch, also referred to as a security switch herein may be, for example, a jumper mounted on the system planar 20 and manually setable to two different states by a person having access to the planar. In one state, also referred to herein as the write enable or unlocked state, the EEPROM 95 is set to be active and to store a PAP as described herein. In the write enable state, the PAP may be written to the EEPROM 95, changed or removed. In the other or inactive state, also referred to herein as the write disabled or locked state, the PAP storage capability of the EEPROM 95 is set to be inactive.

As mentioned above, the computer system 10 also has a second component 68 having erasable memory capabilities, namely battery supported, non-volatile CMOS RAM and an associated real time clock (RTC). The CMOS RAM stores data indicative of the system configuration including, in accordance with this invention, data regarding the successful entry of the PAP on power up of the computer system 10. At least one tamper detection switch that electrically connects the cover 15 to the chassis 19 is provided, mounted within the enclosure and operatively connected with the CMOS RAM for detecting opening of the enclosure and for clearing or setting certain data stored in that memory element in response to any switching of the tamper detection switch.

The security and integrity features described above and hereinafter, work independently of a previously offered personal computer security feature, the Power On Password (POP). These additional security and integrity features provide a secure platform for operating system certification under applicable regulations such as The Orange Book. An additional password is required to place the system in secure mode. The new password is here referred to as the Privileged Access Password (PAP). To maintain compatibility with previous personal computer systems, the POP is still supported.

Password security is implemented by system hardware features including the flash memory 66, the EEPROM 95, a security switch and a tamper evident cover switch, firmware, POST code and the system software password utility. Once the PAP has been installed, the system is in Secure Mode. The PAP is saved in the EEPROM 95. A backup copy of the PAP is also maintained in the EEPROM 95. The backup copy is maintained to prevent accidental loss of the PAP when a power failure occurs during the installation, change, or removal of the PAP. The POP and at least certain bits indicative of the validity of the PAP, when installed, are stored in the CMOS RAM 66. Changes in data retained in the CMOS RAM 66 and in the EEPROM 95 are independent one from the other.

Figure 4:
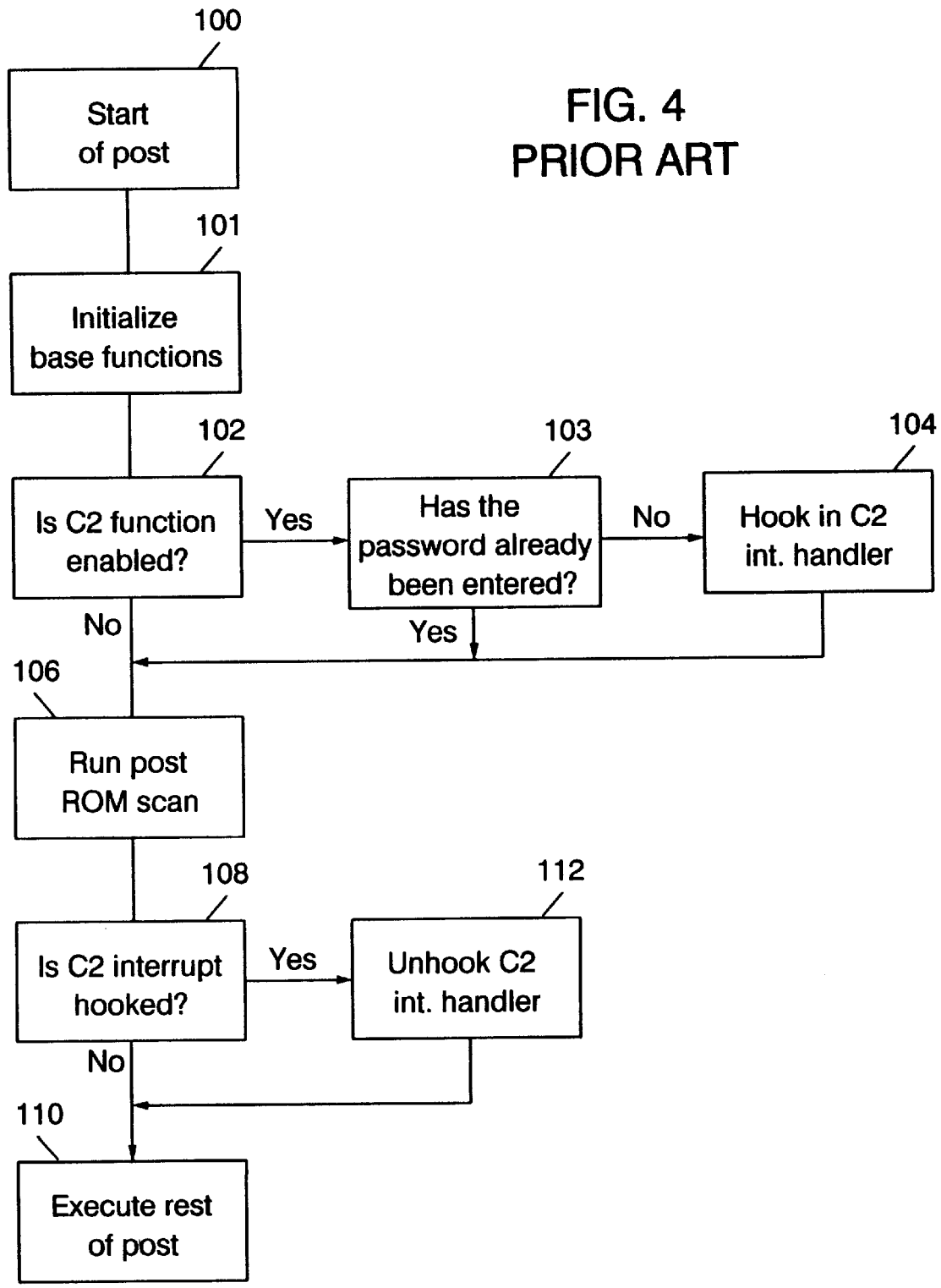
FIG. 4 is a schematic view of the steps involved in a security procedure according to the principles practiced in U.S. Pat. document Ser. No. 08/681,740.

FIG. 4 is illustrative of the process which disables the keyboard prior to the adapter ROM scan and wherein the password protection is as is provided by the invention disclosed in U.S. Pat. document Ser. No. 08/681,740. FIG. 4 illustrates that process which includes the interrupt handler that is hooked prior to the ROM scan and wherein the password protection lies. This interrupt handler has several functions. If the interrupt handler is activated at step 104, after start of POST, initialization of Minimal Base Functions, enablement of the security features of C2 and determination that the password has not been entered at steps 100, 101, 102 and 103. If however the proper password is entered, the stored keystroke key sequence will be lead back in the queue for handling by the adapter ROM and the interrupt routine finishes, allowing the adapter ROM to continue running with the proper keystroke information. In addition, the interrupt handler also marks that the password has been correctly entered so that the user is not prompted again during this cycle of the POST code.

This mechanism provided in FIG. 4 allows for the proper prompting of the password prior to running any adapter ROM utilities, and maintains the integrity of the customer input. It also provides a certain, but limited level of protection to the configuration utilities of the system.

In accordance with the security features as was known to be provided in the prior art, a security utility program is stored in the system partition of the mass storage device and is inaccessible to either a Normal User or an Unauthorized User of the personal computer system to enable one of either a System Owner or an Authorized User to (a) selectively modify the aforementioned prioritized initial loading program by specifying the number and priority order of the group of a plurality of Initial Program Load (IPL) sources and (b) selectively modify the prioritized initial loading program by deleting the BASIC interpreter program stored in BIOS ROM from the group of IPL sources.

Figure 5:
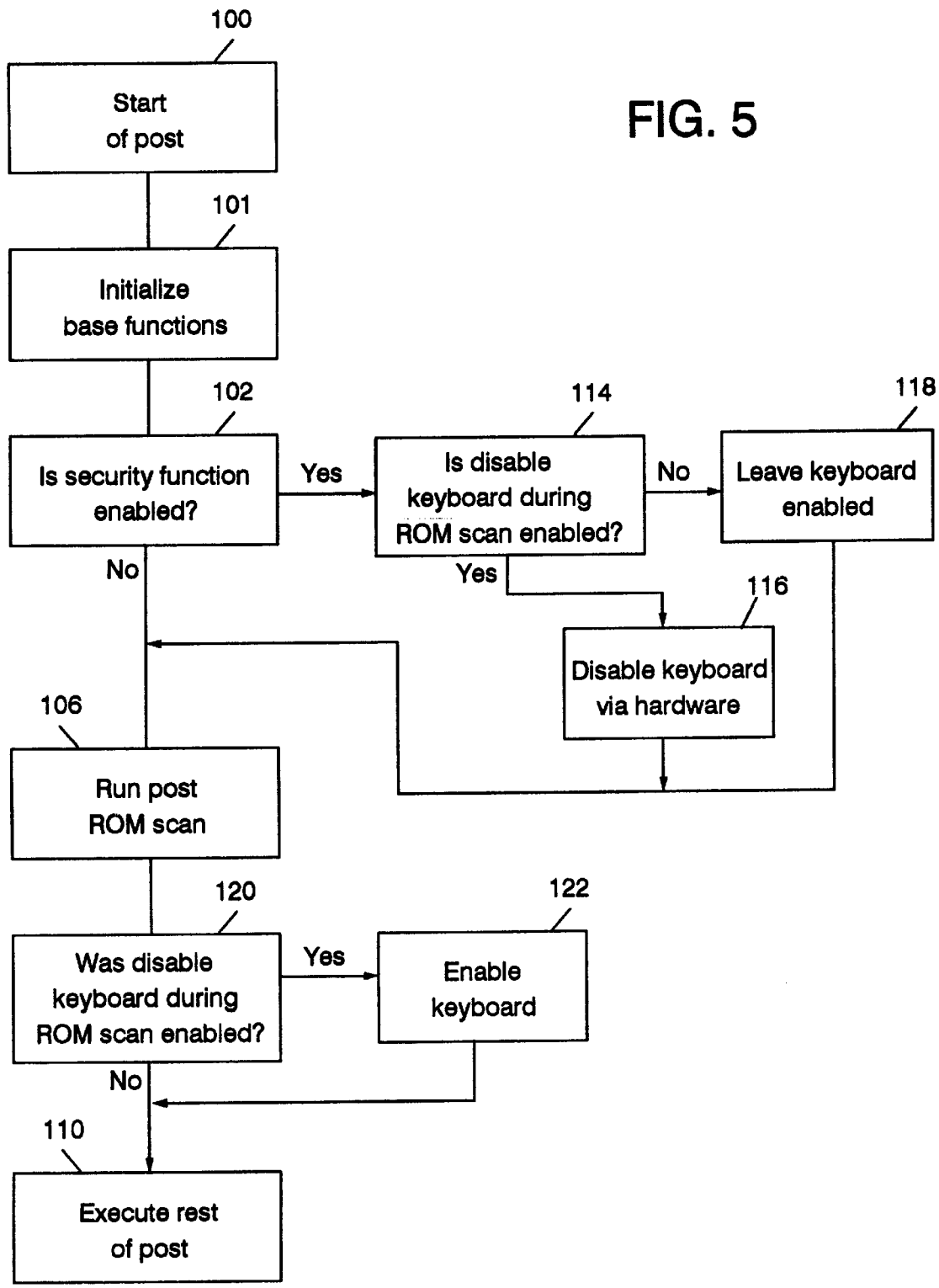
FIG. 5 is a schematic view of the steps practiced in the representative personal computers of FIGS. 1 and 2 according to the security features of the present invention.

In the present invention, at least one not previously addressed or recognized factor is taken into consideration which prevents intrusive inadvertent or deliberate reconfiguration invoked by adaptor provided code and utilities. This present contribution provides for preventing such an undesirable and/or unintended task with the result that any provided password security protection is maintained. This can be best seen in FIG. 5 when considering the necessary protocol after the steps 100, 101 and 102 of FIG. 4 are carried out. If the security, for example C2, function is enabled there needs to be a determination if the keyboard is disabled or locked. This is provided for in step 114 where the query, 'Is Lock (Disable) Keyboard During ROM Scan Enabled?,' is made. If not enabled, than in step 118 the keyboard is left enabled or unlocked. However, if the instruction is to disable or lock the keyboard than in step 116 the procedure of disabling or locking the keyboard is implemented by the hardware. As is set forth in FIG. 4 the following step 106 of running the POST ROM scan is carried out. After completion, the necessary inquiry of step 120 asks, 'Was Lock (Disable) Keyboard During ROM Scan Enabled?' If it was enabled, then in step 122 the keyboard is enabled or unlocked and the balance of the POST is executed as was described for step 110.

In the drawings and specifications there has been set forth a preferred embodiment of the invention and, although specific terms are used, the description thus given uses terminology in a generic and descriptive sense only and not for purposes of limitation.

What is claimed is:

1. A computer system with enhanced security for an initialization process, comprising:

a CPU for executing code, system BIOS executable on said CPU, and an input device in communication with said CPU;

at least one code device having utility code capable of controlling the CPU after at least one POST initialization code instruction within the system BIOS has been executed;

scan code within the system BIOS providing for the identification of the presence of the at least one code device;

lock code within the system BIOS providing for the disablement of the input device, such that the input device does not transmit input signals to the CPU despite operator manipulation of the input device;

control transfer code providing for execution by the CPU of the utility code on the at least one code device; and unlock code within the system BIOS providing for the enablement of the input device after the utility code on the at least one code device has been executed by the CPU.

2. The computer system as set forth in claim 1, wherein the system BIOS includes code for authenticating the at least one code device after identification of the presence of the at least one code device.

3. The computer system as set forth in claim 1, wherein the system BIOS includes code for relinquishing control to the at least one code device after disablement of the input device, such that the input device is prevented from transmitting input while control is maintained by the at least one code device.

4. The computer system as set forth in claim 1, wherein:

the scan code searches for at least one other code device having utility code capable of controlling the CPU after executing the utility code on the at least one code device;

the utility code on the at least one other code device executes while said input device is disabled; and the unlock code enables the input device after execution of the utility code on the at least one other code device.

5. The computer system as set forth in claim 4, wherein:

the unlock code enables the input device after execution of the utility code on each code device ends; and the lock code disables the input device before execution of the utility code on each device begins.

6. A computer system having hardware, comprising:

a central processing unit (CPU);

system memory;

a system memory controller connected to the system memory;

a host bus connecting the CPU and the system memory controller;

a PCI bus coupled to the system memory controller;

an input device;

an input device controller coupling the PCI bus and the input device;

at least one adapter code device having utility code connected to the PCI bus;

system BIOS code including a POST code for configuring the hardware of the computer system and for disabling the input device after commencement of the POST code and before searching for the adapter code device, such that the input device does not transmit input signals to the CPU despite operator manipulation of the input device;

system BIOS code identifying the adapter code device;

system BIOS code for relinquishing control of the CPU to the adapter code device for execution of the utility code included within the adapter code device;

system BIOS code for enabling the input device; and system BIOS code for completing any POST code not executed prior to relinquishing control of the CPU to the adapter code device.

7. A computer system having hardware, comprising:

a central processing unit (CPU);

system memory;

a system memory controller directly connected to the system memory;

a host bus directly connecting the CPU and the system memory controller;

a universal serial bus coupled to the system memory controller;

an input device;

an input device controller coupled to the universal serial bus and the input device;

at least one adapter code device having utility code connected to the universal serial bus;

system BIOS code including a POST code for configuring the hardware of the computer system and for disabling the input device after commencement of the POST code and before searching for the adapter code device, such that the input device does not transmit input signals to the CPU despite operator manipulation of the input device;

system BIOS code identifying the adapter code device;

system BIOS code for relinquishing control of the CPU to the adapter code device for execution of the utility code included within the adapter code device;

system BIOS code for enabling the input device; and system BIOS code for completing any POST code not executed prior to relinquishing control of the CPU to the adapter code device.

8. A method for securing access to an information handling system having a CPU, an input device, system BIOS, and at least one code device having utility code capable of controlling the CPU, comprising the steps of:

executing at least one POST initialization code instruction within the system BIOS;

searching for the at least one code device after at least one POST initialization code instruction has been executed;

identifying the presence of the at least one code device;

disabling the input device, such that the input device does not transmit input signals to the CPU despite operator manipulation of the input device;

executing the utility code on the least one code device after disabling the input device; and enabling the input device after executing the utility code on the at least one code device.

9. The method as set forth in claim 8, further including, after the step of identifying the presence of the at least one code device, the step of authenticating the at least one code device.

10. The method as set forth in claim 8, further including, after the step of disabling the input device, the step of relinquishing control to the at least one code device.

11. The method as set forth in claim 8, further including, after the step of executing the utility code on the at least one code device, the steps of:

searching for at least one other code device having utility code capable of controlling the CPU;

identifying the presence of the at least one other code device;

executing the utility code on the at least one other code device;

enabling the input device after executing the utility code on the at least one other code device; and executing any POST initialization code instruction which was not executed before commencement of the step for searching for the at least one code device having utility code capable of controlling the CPU.

* * * * *